United States Patent
Kamimura et al.

(10) Patent No.: US 7,531,991 B2
(45) Date of Patent: May 12, 2009

(54) OUTPUT VOLTAGE REGULATOR FOR ENGINE-DRIVEN GENERATOR

(75) Inventors: Kenji Kamimura, Saitama (JP); Koichi Asai, Saitama (JP); Kazufumi Muronoi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 126 days.

(21) Appl. No.: 11/508,332

(22) Filed: Aug. 23, 2006

(65) Prior Publication Data
US 2007/0182381 A1    Aug. 9, 2007

(30) Foreign Application Priority Data
Aug. 24, 2005 (JP) .............................. 2005-242527

(51) Int. Cl.
H02H 7/06 (2006.01)
H02P 9/00 (2006.01)
G05F 1/00 (2006.01)

(52) U.S. Cl. .............................. 322/28; 322/17; 322/25; 323/282

(58) Field of Classification Search ................. 323/282; 322/17, 25, 28
See application file for complete search history.

(56) References Cited

U.S. PATENT DOCUMENTS 6,215,284 B1 * 4/2001 Komurasaki et al. ......... 322/25
6,761,148 B2 * 7/2004 Kiessling ................ 123/406.57
2005/0149281 A1 * 7/2005 Kawabata ..................... 702/64

FOREIGN PATENT DOCUMENTS

JP    3-41038    6/1991

* cited by examiner

Primary Examiner—Akm E Ullah
Assistant Examiner—Johali A Torres Ruiz
(74) Attorney, Agent, or Firm—Arent Fox LLP

(57) ABSTRACT

An output voltage regulator for an engine-driven generator that can satisfactory suppress fluctuation in output voltage, even when an output waveform of the generator is distorted. An engine revolution period that represents a period of output voltage is detected by use of an ignition signal. Data that represents an output waveform is obtained by squaring and adding up an instantaneous value of the output voltage for one period of engine revolution. Furthermore, a square root of the data is extracted as an effective value. An operation duty of a transistor Q1 provided in an output circuit of an excitation winding L2 that supplies a field current "if" is determined based on a difference between the effective value and a target voltage. The field current "if" changes according to the difference, and the output voltage is thereby regulated according to a load.

3 Claims, 3 Drawing Sheets

PRIOR ART

OUTPUT VOLTAGE REGULATOR FOR ENGINE-DRIVEN GENERATOR

BACKGROUND OF THE INVENTION

1. Field of the Invention

The present invention relates to an output voltage regulator for an engine-driven generator, and more particularly, to an output voltage regulator for an engine-driven generator that can suppress fluctuation in output voltage, even when an output waveform of the generator is distorted under the influence of a load, by accurately detecting a stable alternating current cycle and providing feedback control at an effective value of voltage.

2. Description of the Related Art

As a means for suppressing fluctuation in output voltage of a generator, for example, an automatic voltage regulator disclosed in Japanese Published Examined Patent Application No. H03-41038 is known. FIG. 3 is a circuit diagram according to an example of an automatic voltage regulator conventionally known. The automatic voltage regulator is provided with an excitation winding 11, a control circuit 12, a field winding 13, a detection winding 14, and a detection circuit 19. The detection winding 14 is connected in series to an unillustrated output winding. Output voltage of a generator is detected as a peak voltage of a ripple voltage by the detection circuit 19 composed of the detection winding 14, a full-wave rectifier 15, a capacitor 16, and resistors 17 and 18. The control circuit 12 has a Zener diode 20 and Darlington-connected transistors Q1 and Q2, and controls a field current "if" according to a voltage Vc obtained by dividing the ripple voltage by the resistors 17 and 18. Namely, when a relationship between the voltage Vc and a set voltage Vz by the Zener diode 20 is Vc<Vz, the transistor Q1 is turned off and the transistor Q2 is turned on. As a result, to the field winding 13, output voltage of the excitation winding 11 flows as the field current "if".

FIGS. 4A-4C are views showing operations of the circuit shown in FIG. 3. When a load connected to a generator is light, the section with Vc<Vz is narrow and the field current "if" is small as shown in FIG. 4A. On the other hand, when the load increases, the peak value Vc is lowered to expand the section with Vc<Vz, so that the field current "if" increases.

On the other hand, for example, in such a case that the output waveform is distorted by overloading, the section with Vc<Vz changes according to the distortion in the output waveform as shown in FIG. 4C, and the field current "if" always fluctuates.

The automatic voltage regulator has widely spread in use since the method for detecting and controlling output voltage is simple. However, as described above, since a detection signal obtained by comparison of the peak value Vc of a detection waveform being a ripple current with the set voltage Vz is fed back, there is a problem such that fluctuation in output voltage also increases due to distortion in the output waveform.

A variety of countermeasures have been taken against various phenomena caused by the problem, however, on the assumption that a peak value of the detection waveform is detected, influence of distortion in the output waveform is unavoidable.

For this reason, it has been considered to calculate effective value data by sampling one period of the output waveform as digital data and feedback the effective value data. According to the digital sampling, highly accurate feedback control can be carried out even when distortion in the waveform occurs.

By the control method by digital data sampling, it is easy to judge one period if the output frequency has been fixed at a predetermined frequency set accurately by an inverter, as in an inverter-controlled generator distributed in recent years. However, as in a single-phase synchronous generator driven by an engine, in a generator for which an output frequency is determined based on the number of engine revolutions and the number of magnetic poles, since it is necessary to distinguish one period based on a zero-cross point of the output waveform, one period can be erroneously detected due to distortion in the output waveform occurs. For example, in such a case of capacitive and inductive loads as in a mercury lamp or an electric power tool, a zero-cross point sometimes occurs multiple times in the interval of one period.

SUMMARY OF THE INVENTION

It is an object of the present invention to solve the problems described above, and to provide an output voltage regulator that can carry out feedback control based on an accurate effective value in a synchronous generator driven by an engine.

In order to achieve the object described above, the present invention has a first feature, in an output voltage regulator for a generator constructed so as to supply a current obtained by rectifying an output of an excitation winding provided in a generator driven by an engine to a field winding by control with a feedback signal of a generator output voltage, including: an output voltage waveform detection means that detects a waveform of the generator output voltage; a synchronous signal detection means that detects a revolution period of the engine; a means that converts the generator output voltage waveform sampled in the revolution period to an effective value; and a means that forms the feedback signal based on the effective value.

In addition, the present invention has a second feature in that the synchronous signal detection means is constructed so as to detect a revolution period based on an operation signal of an ignition system of the engine.

In addition, the present invention has a third feature in that the generator output voltage waveform is detected based on a voltage of an output terminal line.

In the first feature, focusing on a point that the frequency of output voltage is synchronized with a revolution period of the engine and a point that the number of engine revolutions is fixed so as to maintain a fixed output frequency, an output period that is necessary for calculation of an effective value is detected by the revolution period of the engine in place of a period of the output waveform, and an effective value of the output voltage is calculated based thereon. Therefore, according to the first feature, even when the output voltage waveform of the generator is greatly distorted under the influence of a load or the like, a stable basic period can be accurately detected. As a result, since fluctuation in output voltage can be compensated by feedback control with an effective value not of a peak voltage but of an output voltage, a very satisfactory effect to suppress fluctuation in output voltage can be obtained.

According to the second feature, since an ignition signal of an engine ignition system is utilized, detection of a revolution period is easy.

According to the third feature, the voltage waveform is detected based on a voltage of an output terminal line. Therefore, different from the conventional voltage regulator for a generator in which voltage is detected from the detection winding connected in series to the output winding, the influence of a change in the temperature of the detection winding on a voltage detection result can be avoided.

DETAILED DESCRIPTION OF THE PREFERRED EMBODIMENTS

Figure 1:
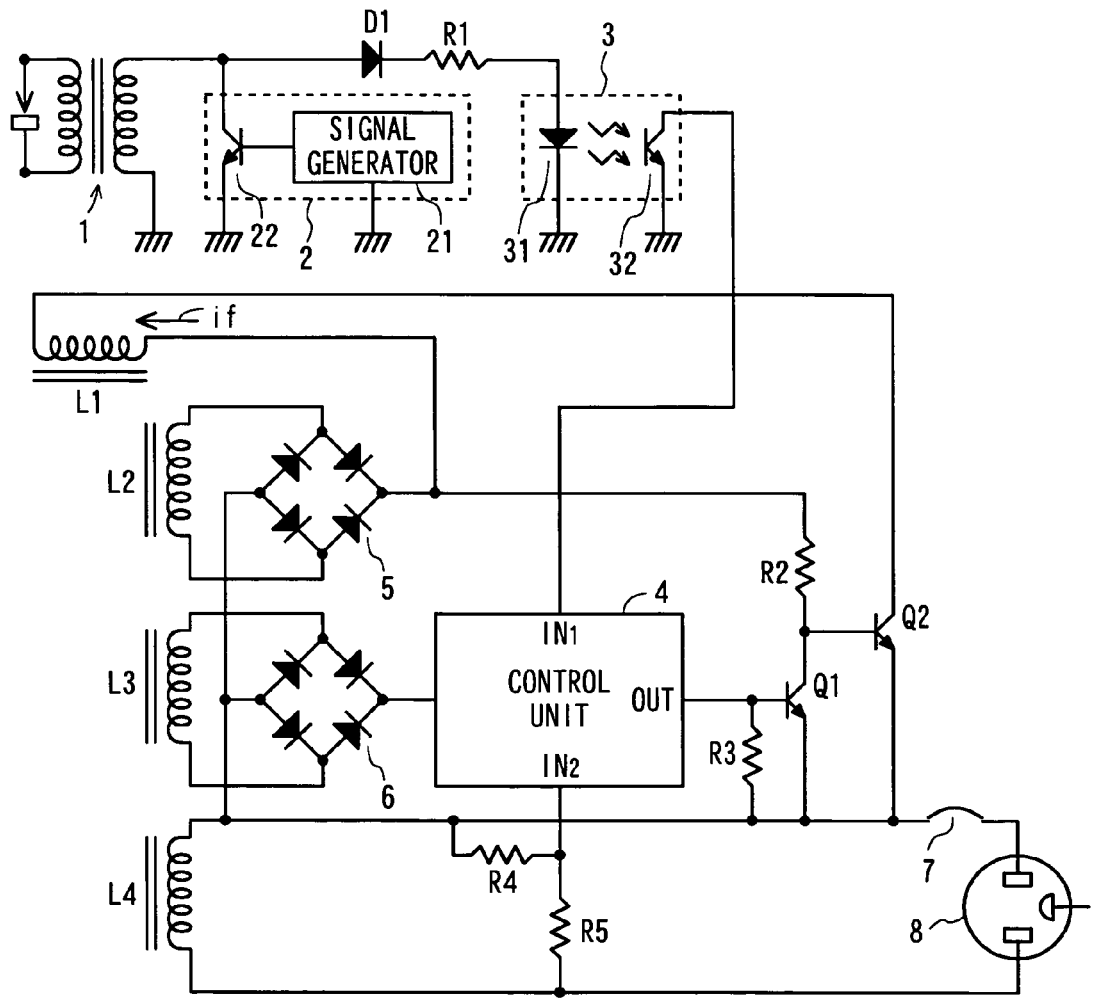
FIG. 1 is a circuit diagram of an output voltage regulator for a generator according to an embodiment of the present invention.

Hereinafter, an embodiment of the present invention will be described in detail with reference to the drawings. FIG. 1 is a main-part circuit diagram of an output voltage regulator for an engine-driven generator according to an embodiment of the present invention. The engine-driven generator is provided with a field winding L1 wound around an unillustrated rotor, an excitation winding L2 wound around an unillustrated stator, a control power winding L3, and an output winding L4. The rotor wound with the field winding L1 is coupled to an output axis of an unillustrated engine and rotates in synchronization with engine revolutions. The generator in the present embodiment has a two-salient pole rotor, and the number of engine revolutions is controlled by an unillustrated governor to be 3000 rpm when the output frequency required for the generator is 50 Hz, and 60 Hz, to be 3600 rpm.

An ignition coil 1 and a transistor ignition circuit 2 that form an ignition system of the engine are provided. The transistor ignition circuit 2 has a signal generator 21 that generates an ignition signal and a semiconductor control element (for example, transistor) 22 that is turned on and off by the ignition signal from the signal generator 21. A primary side of the ignition coil 1 is connected to the transistor 22, and is also connected to a light-emitting diode 31 that forms a transmission side of a photocoupler 3 via a diode D1 and a resistor R1. A photo transistor 32 that forms a reception side of the photocoupler in a manner paired with the light-emitting diode 31 is connected to an input terminal IN1 of a control unit 4. The control unit 4 is provided with a microcomputer. The signal generator 21 is constructed so as to generate an ignition signal per one engine revolution by a detection coil arranged at the outer circumference of a rotary component (for example, a flywheel) rotated by the engine, and an ON/OFF signal of the photo transistor 32 is equivalent to a one-period signal of engine revolution. The control unit 4 detects an ON/OFF cycle of the phototransistor 32 so as to detect one period of engine revolution.

Both ends of the excitation winding L2 are connected to input sides of a first full-wave rectifier 5, and output sides of the first full-wave rectifier 5 are connected with the field winding L1, a first transistor Q1, and a second transistor Q2.

Both ends of the control power winding L3 are connected to input sides of a second full-wave rectifier 6, and output sides of the second full-wave rectifier 6 are connected to the control unit 4 so as to supply a control power. An output terminal OUT of the control unit 4 is connected to a base of the first transistor Q1.

The output winding L4 is connected to an AC output terminal 8 via a breaker 7, and a connection point between resistors R4 and R5 connected in parallel to the output winding L4 is connected to an input terminal IN2 of the control unit 4. The control unit 4 detects voltage (output voltage) at both ends of the output winding L4 as a voltage divided by the resistors R4 and R5.

The control unit 4 suppresses fluctuation in output voltage by calculating a waveform area by digitally sampling, in accordance with an engine revolution period signal inputted from the input terminal IN1, an output voltage inputted from the input terminal IN2 for one period of engine revolution so as to determine an effective value of output voltage and controlling to increase and decrease a field current "if" according to fluctuation in the effective value. In FIG. 1, the first transistor Q1 is PWM-controlled at a duty determined so as to approximate the effective value to a target voltage, and by the second transistor Q2 Darlington-connected to the first transistor Q1, the current "if" that flows from the first full-wave rectifier 5 to the field winding L1 is controlled.

For example, when the output voltage of the output winding L4 lowers owing to an increase in load current, an effective value of the output voltage to be detected lowers, therefore, the first transistor Q1 and the second transistor Q2 increase the field current "if" so as to approximate the effective value to a target voltage and thereby raise the output voltage of the output winding L4.

Conversely, when the output voltage of the output winding L4 rises owing to a light load, an effective value of the output voltage to be detected increases, therefore, the first transistor Q1 and the second transistor Q2 operate so as to decrease the field current "if" and thereby lower the output voltage of the output winding L4 to a target voltage.

In this manner, the generator is controlled so that the effective value of the output voltage converges to a target value according to fluctuation in the load.

Figure 2:
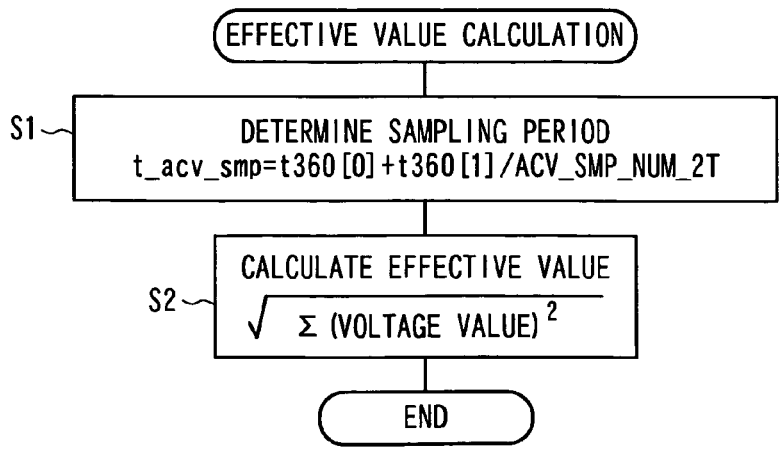
FIG. 2 is a flowchart showing effective value calculating procedures.
Figure 3:
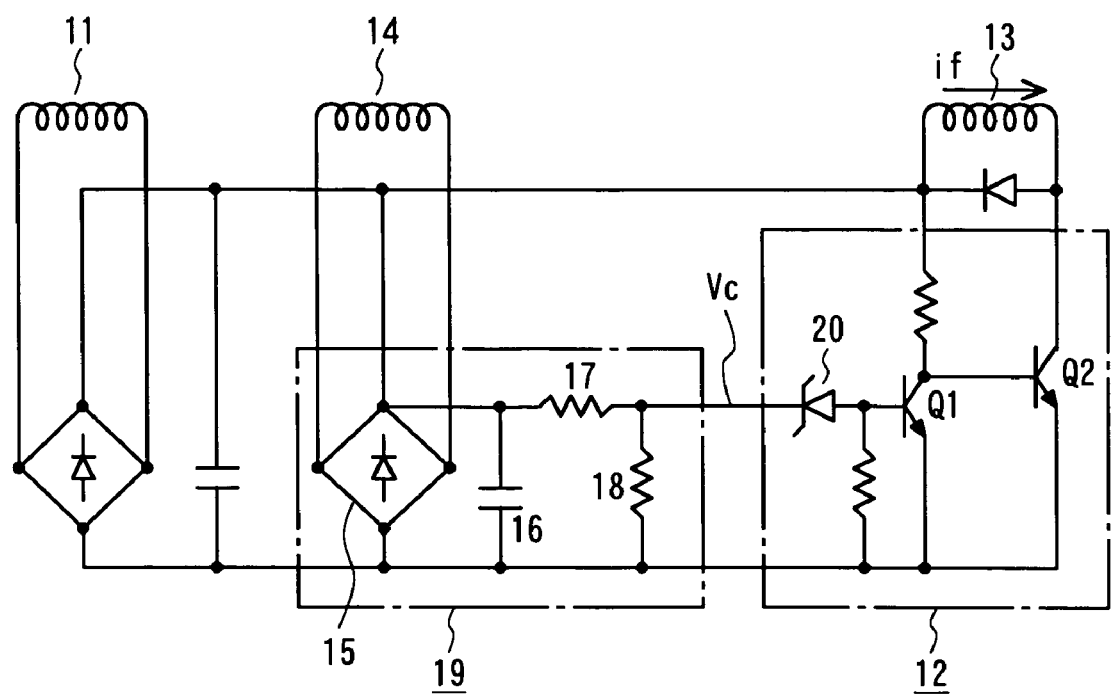
FIG. 3 is a circuit diagram of an output voltage regulator according to a conventional art.
Figure 4A:
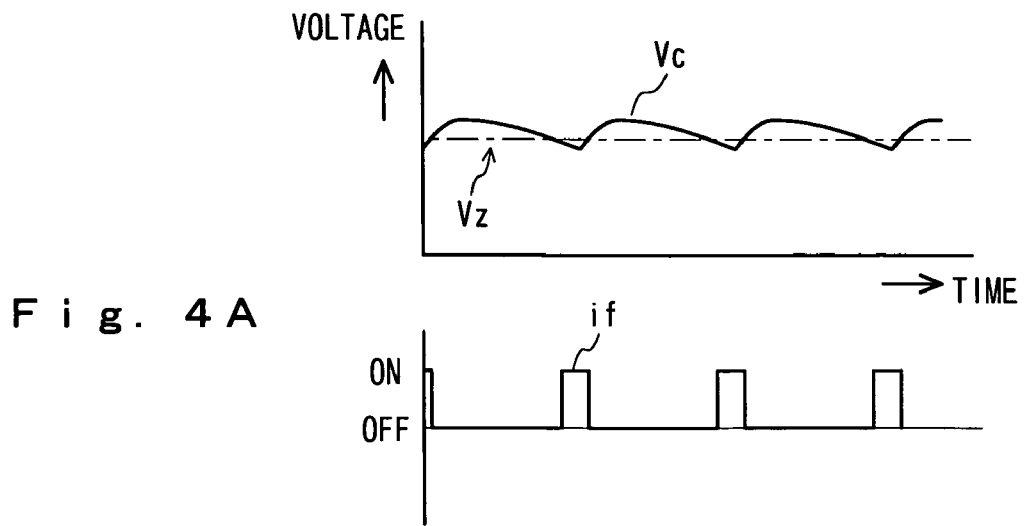
FIGS. 4A-4C are operation explanatory diagrams of the circuit in FIG. 3.
Figure 4B:
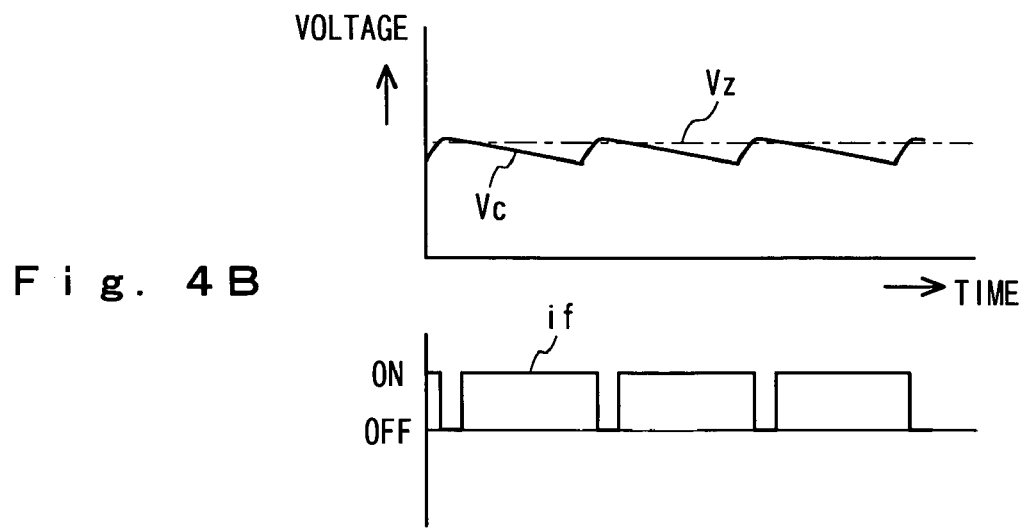
Figure 4C:
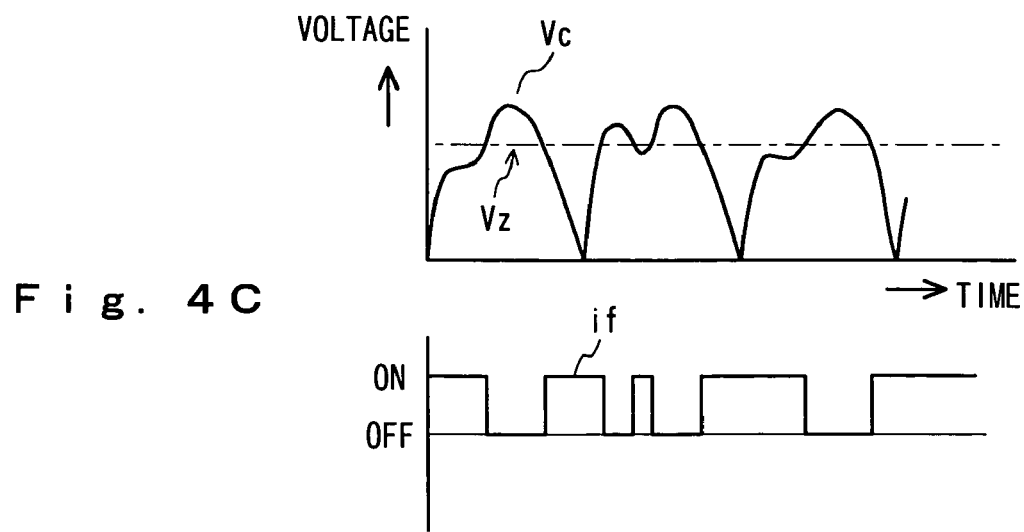

Next, procedures for calculating the effective value will be described with reference to a flowchart. In step S1 of FIG. 2, a sampling period of output voltage is determined. The sampling period t_acv_smp is calculated as a value obtained by dividing the two most recent engine revolution periods t360[0]+t360[1] by a set value ACV_SMP_NUM_2T (for example, "10").

In step S2, an effective value is calculated. The effective value is calculated by adding up a square of an instantaneous value of the output voltage for one period and extracting a square root thereof. Data that represents an output waveform can be obtained by adding up a square of an instantaneous value of the output voltage.

In this manner, the sampling period of the output voltage varies in synchronization with the engine revolution period. Therefore, even when engine overloading that is beyond immediate control of the governor is produced by a load current excessively increased and an engine revolution fluctuation slightly occurs due to a delay in follow-up by the governor, calculation of the effective value can be periodically carried out with accuracy.

Using the effective value calculated in this manner as a detection voltage, the feedback amount, that is, a duty for PWM control is calculated by using the following expressions (Expression 1) and (Expressions 2).

Feedback amount=basic duty+(target voltage−detection voltage)+integral term $Ti$    (Expression 1).

Integral term $Ti=Ti+$(target voltage−detection voltage)+coefficient $Ki$    (Expression 2).

Here, the basic duty is a preset fixed value.

As described above, in a voltage regulator for a synchronous generator, since one period of a generated output can be reliably detected based on the revolution period of the engine, an effective value of voltage can be accurately calculated by digital sampling even when the output waveform is distorted. Here, an example of the generator in which the rotor is provided with a two-pole structure has been shown in the present embodiment, however, regardless of the greatness of the number of poles, as long as it is a synchronous generator, the present invention can be applied similarly to the present embodiment.

What is claimed is:

1. An output voltage regulator for an engine-driven generator constructed so as to supply a current obtained by rectifying an output of an excitation winding provided in generator driven by an engine to a field winding by control with a feedback signal of a generator output voltage comprising:

an output voltage waveform detection means that detects a waveform of the generator output voltage;

a synchronous signal detection means that detects a revolution period of the engine;

a means that receives signals corresponding to the waveform of the generator output voltage and the revolution period of the engine and converts the generator output voltage waveform sampled in the revolution period to an effective value; and a means that forms the feedback signal based on the effective value.

2. The output voltage regulator for an engine-driven generator according to claim 1, wherein the synchronous signal detection means is constructed so as to detect a revolution period based on an operation signal of an ignition system of the engine.

3. The output voltage regulator for an engine-driven generator according to claim 1, wherein the generator output voltage waveform is detected based on a voltage of an output terminal line.

* * * * *